(12) United States Patent
Kaneko et al.

(10) Patent No.: US 7,876,514 B2
(45) Date of Patent: Jan. 25, 2011

(54) LENS BARREL

(75) Inventors: Shuhei Kaneko, Hino (JP); Takashi Miyazawa, Hachioji (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 352 days.

(21) Appl. No.: 12/183,865

(22) Filed: Jul. 31, 2008

(65) Prior Publication Data

US 2009/0052068 A1  Feb. 26, 2009

(30) Foreign Application Priority Data

Aug. 22, 2007  (JP) .............................. 2007-216417

(51) Int. Cl.
*G02B 7/02* (2006.01)
(52) U.S. Cl. ...................... 359/823; 359/819
(58) Field of Classification Search .................. 359/811, 359/813, 819–824
See application file for complete search history.

(56) References Cited

U.S. PATENT DOCUMENTS

| | | | |
|---|---|---|---|
| 6,204,977 B1 * | 3/2001 | Iwasa | 359/700 |
| 6,570,718 B2 * | 5/2003 | Nomura et al. | 359/699 |
| 6,751,031 B2 * | 6/2004 | Yasutomi | 359/819 |
| 6,765,728 B2 * | 7/2004 | Kabe | 359/699 |
| 7,394,600 B2 * | 7/2008 | Yasutomi et al. | 359/699 |

\* cited by examiner

*Primary Examiner*—Ricky L Mack
*Assistant Examiner*—Brandi N Thomas
(74) *Attorney, Agent, or Firm*—Straub & Pokotylo; John C. Pokotylo

(57) ABSTRACT

A lens barrel has an elastically deformable moving frame which is a cylindrical frame member having a first groove group, in which a plurality of grooves formed in the circumferential direction are arranged in the optical axis direction, at the outer periphery thereof, and an elastically deformable rotating frame which is a cylindrical frame member engaging with the outer periphery of the moving frame and having a second groove group, in which a plurality of grooves formed in the circumferential direction are arranged in the optical axis direction so as to face to the first groove group, at the inner periphery thereof, the rotating frame being movable relative to the moving frame without interference of the second groove group with the first groove group during the ordinary operation.

11 Claims, 2 Drawing Sheets

US 7,876,514 B2

LENS BARREL

CROSS REFERENCE TO RELATED APPLICATION

This application claims benefit of Japanese Application No. 2007-216417 filed in Japan on Aug. 22, 2007, the contents of which are incorporated by this reference.

BACKGROUND OF THE INVENTION

1. Field of the Invention

The present invention relates to the construction of a lens barrel having frame members capable of moving relatively.

2. Description of the Related Art

In the conventional lens barrel, as a pair of bayonet-connected frame members including a circumferential groove and a protruding portion slidably connected to the circumferential groove, frame members having a rotating frame supported on a fixed frame of the lens barrel and a moving frame have been known. The rotating frame is rotatably driven by a driving portion of the lens barrel, and also advances and retracts in the lens optical axis direction along with the rotating motion thereof. The moving frame advances and retracts in the lens optical axis direction together with the rotating frame in a state of being fixed to and regulated by the fixed frame because of bayonet-connection thereof to the rotating frame. Also, as another example, frame members that are moved relatively in the lens optical axis direction by a cam groove and a cam follower provided on two frames that move relatively have also been known.

SUMMARY OF THE INVENTION

A lens barrel in accordance with the present invention has a feature of being a lens barrel having an improved impact resistance. The lens barrel includes a first frame member which is an elastically deformable cylindrical frame member having a first groove group, in which a plurality of grooves formed in the circumferential direction are arranged in the optical axis direction, at the outer periphery thereof; and a second frame member which is an elastically deformable cylindrical frame member engaging with the outer periphery of the first frame member and having a second groove group, in which a plurality of grooves formed in the circumferential direction are arranged in the optical axis direction so as to face to the first groove group, at the outer periphery thereof, the second frame member being movable relative to the first frame member without interference of the second groove group with the first groove group during the ordinary operation. In the lens barrel, at least either one or both of the first frame member and the second frame member is deformed by an external force applied to the lens barrel so that the first groove group and the second groove group interfere with each other, whereby the relative shift in the optical axis direction of the first frame member and the second frame member is prevented.

Other features and advantages of the present invention will become apparent from the following description.

DETAILED DESCRIPTION OF THE PREFERRED EMBODIMENTS

An embodiment of the present invention will now be described with reference to the accompanying drawings.

Figure 1:
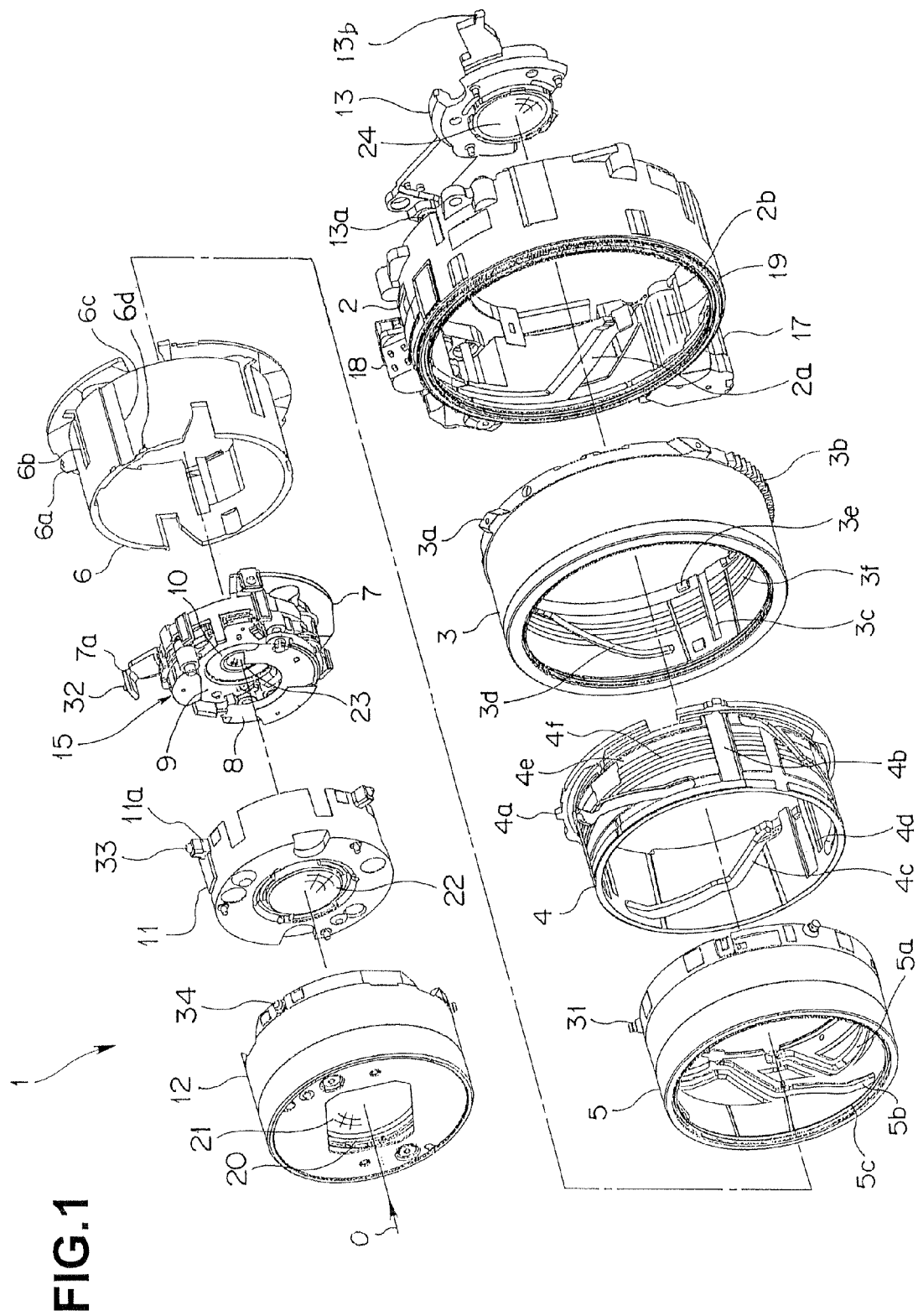
FIG. 1 is an exploded perspective view of a lens barrel in accordance with one embodiment of the present invention.
Figure 2:
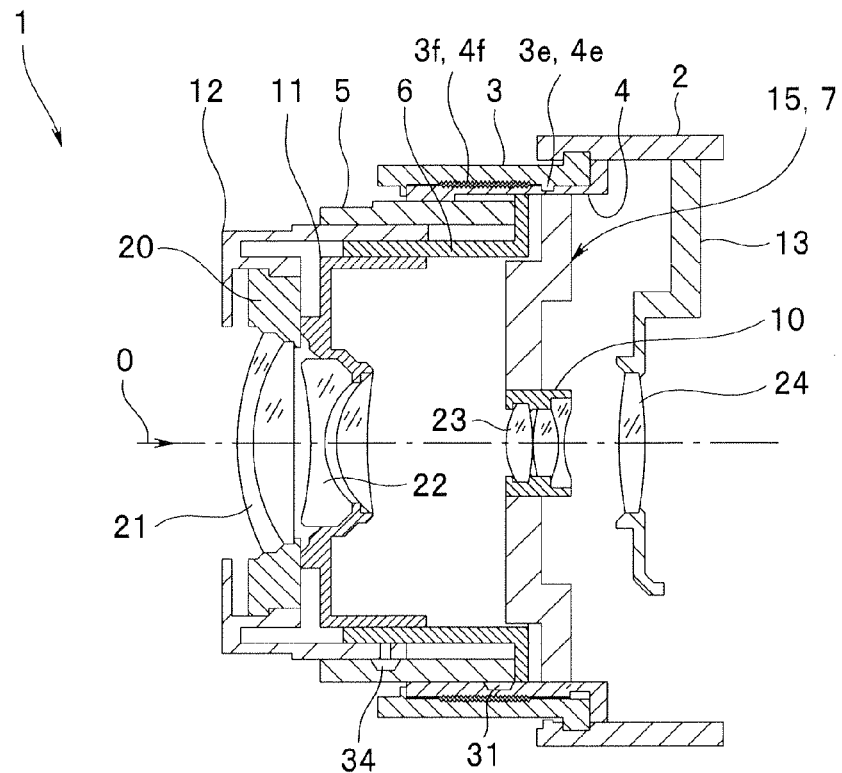
FIG. 2 is a sectional view taken along the optical axis of an essential portion of the lens barrel shown in FIG. 1 in a photographing state (wide state)
Figure 3:
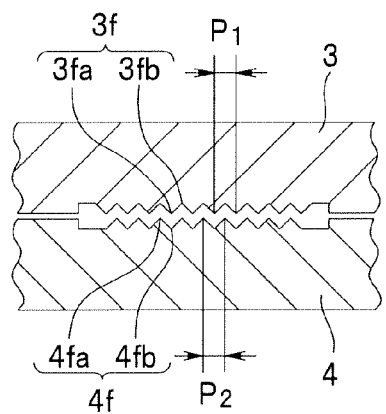
FIG. 3 is an enlarged sectional view taken along the optical axis of an engagement portion (including a first and second groove group portions) of a rotating frame and a moving frame of the lens barrel shown in FIG. 1, showing an ordinary operation state.
Figure 4:
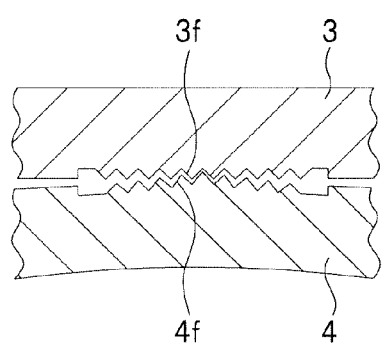
FIG. 4 is an enlarged sectional view taken along the optical axis of an engagement portion (including a first and second groove group portions) of a rotating frame and a moving frame of the lens barrel shown in FIG. 1, showing a state in which the lens barrel is subjected to an impact force from the front of optical axis and thereby the moving frame side is deformed.

FIG. 1 is an exploded perspective view of a lens barrel in accordance with one embodiment of the present invention, FIG. 2 is a sectional view taken along the optical axis of an essential portion of the lens barrel in a photographing state (wide state), and FIGS. 3 and 4 are enlarged sectional views taken along the optical axis of an engagement portion (including a first and second groove group portions) of a rotating frame and a moving frame of the lens barrel. FIG. 3 shows a cross section in an ordinary operation state, and FIG. 4 shows a cross section in the state in which the lens barrel is subjected to an impact force from the front of optical axis and thereby the moving frame side is deformed. In FIGS. 3 and 4, the shapes of the first and second groove groups are enlarged.

In the explanation below, the optical axis of photographing lens is taken as O, and the object side on the lens optical axis 0 is taken as front (the put-out direction of each frame) and the image formation side thereon is taken as rear (the put-in direction of each frame). As the direction of rotation of each member, the direction of rotation viewed from the front side is shown.

A lens barrel 1 of the present embodiment is a collapsible lens barrel capable of being changed from the state in which the frame member projects in the optical axis O direction (between wide angle and telephoto), in which state photographing can be performed, to the state in which the frame member is collapsed and vice versa.

As shown in FIGS. 1 and 2, the lens barrel 1 has a fixed frame 2, a rotating frame 3 supported by the fixed frame 2, which is a second frame member formed of a synthetic resin, which is rotated and advancingly and retractingly driven at the zooming time and the frame collapsing driving time, a moving frame 4 that is a first frame member formed of a synthetic resin, which is advanced and retracted together with the rotating frame 3 in the state in which the rotation is regulated, a cam frame 5 that is rotated and further advanced and retracted together with the rotating frame 3, a straight guide frame 6 that is advanced and retracted together with the cam frame 5 in the state in which the rotation is regulated, a third group unit 15 that is advancingly and retractingly driven by the rotating frame 3 in the state in which the rotation thereof is regulated, a second group frame 11 and a first group frame 12 that are advancingly and retractingly driven by the cam frame 5 in the state in which the rotation is regulated, a fourth group frame 13 that is advancingly and retractingly driven at the focusing time and the frame collapsing driving time, and a first group lens 21, a second group lens 22, a third group lens 23, and a fourth group lens 24 or a focusing lens that are arranged in the named order from the front side of the optical axis O as a photographing lens group and are held by the first group frame 12, the second group frame 11, a third group frame 10, and the fourth group frame 13, respectively.

The advancingly and retractingly driving direction of each of the above-mentioned frame members is the direction along the optical axis O direction.

The fixed frame 2, which is a cylindrical member, is provided with a cam groove 2a, in which a tilting cam groove portion tilting with respect to the optical axis O and a circumferential cam groove portion along the circumference are coupled, and a straight groove 2b, which extends along the optical axis O, in the inner peripheral portion thereof. Also, in the outer peripheral portion of the fixed frame 2, a zooming unit 17 including a zoom motor, a gear train, and a long gear 19 for performing zooming driving of the photographing lens and a focusing unit 18 including a focus motor, a gear train, a feed screw, and a guide shaft for performing focusing driving of the photographing lens are arranged.

The long gear 19 is supported in a state of being exposed to the inner peripheral portion of the fixed frame 2 along the direction parallel with the optical axis O.

The rotating frame 3, which is an elastically deformable cylindrical member that is fitted in the inner peripheral portion of the fixed frame 2 so as to be capable of turningly advancing and retracting, is provided with cam followers 3a, which are slidably fitted in the cam groove 2a of the fixed frame 2, and a gear portion 3b, which meshes with the long gear 35, in the outer periphery rear portion thereof. In the inner peripheral portion of the rotating frame 3 are provided a cam groove 3d for third group tilting with respect to the optical axis O direction, a straight groove 3c for cam frame extending along the optical axis O direction, a protruding portion 3e formed in the inner periphery rear end portion, and a second groove group 3f extending in the circumferential direction of the inner peripheral surface.

The rotating frame 3 is supported in the state in which the cam followers 3a are slidably fitted in the cam groove 2a of the fixed frame 2. The rotating frame 3 is rotatingly driven by the long gear 19 via the gear portion 3b. Specifically, the rotating frame 3 is put out from the frame collapsed position to the wide position at which photographing can be performed, and subsequently is rotatingly driven to the telephoto position without advancing and retreating in the optical axis O direction.

The moving frame 4, which is an elastically deformable cylindrical member that is fitted in the inner peripheral portion of the rotating frame 3 in a loosely engaged state so as to be rotatable relatively, can be advanced and retracted in the state in which the rotation thereof is regulated by the fixed frame 2. In the rear end outer peripheral portion of the moving frame 4, a guide protruding portion 4a fitted in the straight groove 2b of the fixed frame 2 is provided. Further, as groove portions penetrating the inner and outer peripheries of the moving frame 4, a cam groove 4c for cam frame, which tilts with respect to the optical axis O direction and in which the facing groove surface tilts in the radial direction, straight-shaped straight grooves 4b and 4d, a circumferential groove 4e formed in the outer periphery rear portion, and a first groove group 4f extending along the circumferential direction, which is formed in the outer peripheral portion, are provided. The first groove group 4f and the second groove group 3f on the rotating frame 3 side face to each other in the inner and outer peripheral portions, and are arranged with a very narrow gap being provided (in a loosely engaged state).

The moving frame 4 is connected (bayonet-connected) to the rotating frame 3 in a state of being capable of being rotated relative to the rotating frame 3 by engaging the protruding portion 3e in the inner peripheral portion of the rotating frame 3 with the circumferential groove 4e in a state of being fitted therein and moving integrally in the optical axis O direction.

As shown in FIG. 3, the second groove group 3f of the rotating frame 3 includes a plurality of stripe-shaped protruding portions 3fa and groove portions 3fb having a minute pitch P1 in the optical axis O direction, the protruding portions 3fa and groove portions 3fb being formed along the circumferential direction. The protruding portion 3fa has a tip end having a pointed shape, and the groove portion 3fb has a bottom portion having a V shape, so that the second groove group 3f has a so-called saw-toothed cross section. On the other hand, the first groove group 4f of the moving frame 4 includes a plurality of stripe-shaped protruding portions 4fa and groove portions 4fb having a minute pitch P2 in the optical axis O direction, the protruding portions 4fa and groove portions 4fb being formed along the circumferential direction. The protruding portion 4fa has a tip end having a pointed shape, and the groove portion 4fb has a bottom portion having a V shape, so that the first groove group 4f has a so-called saw-toothed cross section. In the present invention, the pitches P1 and P2 are equal to each other. However, even if the pitches P1 and P2 are different from each other, the same effect is achieved.

In the ordinary operation state, the rotating frame 3 and the moving frame 4 are in a loosely engaged state as described above, and the protruding portions 3fa and the protruding portions 4fa are positioned in such a maimer that a small gap is provided in the radial direction as shown in FIG. 3.

However, in the case where the lens barrel 1 is subjected to an external force as described later and the moving frame 4 is expanded (distorted) in the outer periphery direction, or in the case where the rotating frame 3 is distorted in the radial direction, the first groove group 4f and the second groove group 3f become in a state of meshing with each other (overlapped state) as shown in FIG. 4, or become in a state of being brought into firm contact with each other.

By the meshing of the first groove group 4f with the second groove group 3f, the moving frame 4 is made in the state in which the movement thereof in the optical axis O direction with respect to the rotating frame 3 is inhibited. Also, in the case where the external force is applied, even if the groove groups are not meshed with each other, the first groove group 4f and the second groove group 3f are brought into contact with each other by the above-mentioned deformation, by which a large frictional force is generated, so that the impact energy is absorbed by the wear of the protruding portions 3fa and 4fa, and the relative movement in the optical axis O direction of the moving frame 4 and the rotating frame 3 may be inhibited. The wear of the protruding portions 3fa and 4fa becomes no hindrance to the operation of the lens barrel 1.

The cam frame 5, which is an elastically deformable cylindrical member fitted in the inner peripheral portion of the moving frame 4, is provided with cam followers 31 in the outer periphery rear portion thereof, further provided with a cam groove 5a for second group and a cam groove 5b for first group, which tilt with respect to the optical axis O direction and in which the facing groove surfaces tilt in the radial direction, in the inner peripheral portion thereof, and also provided with a circumferential groove 5c in the front end portion thereof.

The cam frame 5 is supported in the state in which the cam followers 31 penetrate the cam groove 4c of the moving frame 4 in a state of being engaged slidably, and the tip end portions of the cam followers 31 are fitted in the straight groove 3c of the rotating frame 3. The cam frame 5 is turned together with the rotating frame 3, and is advancingly and retractingly driven relatively in the optical axis O direction by the moving frame 4.

The straight guide frame 6, which is a cylindrical member, is provided with a guide protruding portion 6a, which is fitted in the straight groove 4b of the moving frame 4, in the rear end outer peripheral portion thereof, and further provided with straight grooves 6b for second group extending along the optical axis O direction, which penetrate the inner and outer peripheries, a bottomed straight groove 6c for first group extending along the optical axis O direction, which is formed in the outer peripheral portion, and a protruding portion 6d formed in the front end outer peripheral portion.

The straight guide frame 6 is supported so as to be fitted in the inner peripheral portion of the first group frame 12 fitted in the inner peripheral portion of the cam frame 5 in the state in which the rotation thereof is regulated by the straight groove 4b of the moving frame 4. The straight guide frame 6 is connected (bayonet-connected) to the cam frame 5 in a state of being capable of being rotated relative to the cam frame 5 by fitting the protruding portion 6d in the circumferential groove 5c of the cam frame 5 and moving integrally in the optical axis O direction.

The second group frame 11, which is a cylindrical member, is supported by being fitted in the inner peripheral portion of the straight guide frame 6. The second group lens 22 is held in the front opening portion of the second group frame 11, and in the outer peripheral portion of the second group frame 11, guide protruding portions 11a and taper-shaped cam followers 33, which project from the protruding portions 11a and extend in the radial direction, are provided.

The guide protruding portions 11a fit in the straight grooves 6b of the straight guide frame 6, and the cam followers 33 penetrate the straight grooves 6b and slidably fit in the cam groove 5a of the cam frame 5. Therefore, the second group frame 11 is advancingly and retractingly driven via the cam followers 33 by the cam frame 5 in the state in which the rotation thereof is regulated by the straight guide frame 6.

The first group frame 12, which is a cylindrical member, is supported by being fitted in between the outer peripheral portion of the straight guide frame 6 and the inner peripheral portion of the cam frame 5. The first group lens 21 is held in the front opening portion of the first group frame 12 via a lens holding frame 20, and further a lens barrier (not shown) that can open and close the front surface of the first group lens 21 is arranged. In the outer peripheral portion at the rear end of the first group frame 12, a projecting cam follower 34 is arranged.

The cam follower 34 is positioned at the outer periphery of the straight guide frame 6 and fits in the cam groove 5b of the cam frame 5. Also, a guide protruding portion (not shown) provided in the inner peripheral portion of the first group frame 12 fits in the straight groove 6c of the straight guide frame 6. Therefore, the first group frame 12 is advancingly and retractingly driven via the cam follower 34 by the cam frame 5 in the state in which the rotation thereof is regulated by the straight guide frame 6.

The third group unit 15 has a straight frame 7 for third group, a pressing plate member 8, a shutter frame 9, the third group frame 10, and a rotation driving portion for third group frame. The third group frame 10 is arranged adjacently on the rear side of the shutter frame 9 to hold the third group lens 23.

The straight frame 7 for third group is a frame member capable of advancing and retracting, which is inserted in the inside portion of the moving frame 4. The straight frame 7 for third group is provided with a guide protruding portion 7a, which is fitted in the straight groove 4d for third group of the moving frame 4, and a cam follower 32, which is arranged so as to project from the guide protruding portion 7a to the outside and is engaged with the cam groove 3d for third group of the rotating frame 3, in an arm portion extending in three directions to the outside.

The straight frame 7 for third group is configured so that the rotation thereof is regulated by the moving frame 4, and is advancingly and retractingly driven via the cam groove 3d for third group and the cam follower 32 by the rotating frame 3. At this time, the shutter frame 9, the pressing plate member 8, and the third group frame 10 are also advancingly and retractingly driven together with the straight frame 7 for third group.

The shutter frame 9 has a central opening portion, and incorporates a shutter mechanism including a shutter blade for opening and closing the opening portion and a shutter actuator for openingly and closingly driving the shutter blade. The shutter frame 9 is fixedly supported on the front side of the straight frame 7 for third group, and advances and retracts integrally with the straight frame 7 for third group.

The pressing plate member 8, which is a semi-annular member, is fixed to the straight frame 7 for third group with screws so as to be caused to abut on the front side of the straight frame 7 in the state in which the third group frame 10 and the shutter frame 9 are assembled between the pressing plate member 8 and the straight frame 7.

The third group frame 10 is supported in the straight frame 7 for third group to hold the third group lens 23.

The fourth group frame 13, which holds the fourth group lens 24, has a shaft hole 13a in one end portion and a guide protruding portion 13b in the other end portion. The fourth group frame 13 is inserted in the inside rear of the fixed frame 2. In the shaft hole 13a, a guide shaft (not shown) arranged on the focusing unit 18 is slidably fitted. The guide protruding portion 13b is slidably fitted in a straight groove (not shown) of the fixed frame 2. The fourth group frame 13 is advancingly and retractingly driven along the optical axis O direction to the focusing position at which photographing can be performed and the frame collapsed position along the guide shaft via the gear train and the feed screw by the focusing actuator of the focusing unit 18.

Next, the advancing and retracting operation of each frame member of the lens barrel 1 having the above-described configuration is explained. When the lens barrel 1 is in the wide state in which photographing can be performed as shown in FIG. 2, and the rotating frame 3 is at the wide turning position, the cam followers 3a of the rotating frame 3 fit in a circumferential groove portion on the front side of the cam groove 2a, and the rotating frame 3 is put out together with the moving frame 4. The cam frame 5 is positioned by the cam groove 4c of the moving frame 4, and is put out from the rotating frame 3 further to the front. The first group frame 12 and the second group frame 11 are also put out to the wide position by the cam grooves 5b and 5a of the cam frame 5, respectively.

In order to put out the lens barrel 1 to the telephoto state, the rotating frame 3 is rotatingly driven by the zooming unit 17. By this rotating driving, the cam frame 5 is put out by the cam groove 4c of the moving frame 4 while being rotated, and further, the first group frame 12 and the second group frame 11 are also put out to the telephoto position by the cam grooves 5b and 5a of the cam frame 5, respectively.

In the case where the lens barrel 1 is set down to the frame collapsed state, the rotating frame 3 is rotatingly driven counterclockwise from the wide state shown in FIG. 2 by the zooming unit 17. By this rotating driving, the rotating frame 3 is moved in the put-in direction by the cam groove 2a of the fixed frame 2 while being rotated, and reaches the frame collapsed state. Along with the rotation of the rotating frame 3 from the wide rotation position, the first group frame 12 and the second group frame 11 move in the put-in direction via the cam frame 5. At the same time, the straight frame 7 for third group is also displaced in the put-in direction together with the shutter frame 9 and the third group frame 10, and these frames are put in to the frame collapsed position.

Also, the fourth group frame 13 is advancingly and retractingly driven to the focusing position corresponding to the wide state or the telephoto state, and further to the frame collapsed position by the focusing unit 18.

Now, the behavior in the case where an impact force caused by dropping etc. is applied to the lens barrel 1 is explained. When the first group frame 12 at the tip end of the lens barrel 1 collides strongly with the outside, the cam follower 34 of the first group frame 12 comes into contact with the groove surface of the cam groove 5b of the cam frame 5, the contact force being further transmitted to the cam frame 5, and the cam followers 31 come into contact with the cam groove 4c of the moving frame 4 in the optical axis O direction. Also, when the tip end of the cam frame 5 collides strongly with the outside, the cam followers 31 come directly into contact with the groove surface of the cam groove 4c of the moving frame 4 in the optical axis O direction.

On the other hand, when the lens barrel 1 is dropped with the back surface side (image formation side) thereof being the downside as well, the cam followers 33 of the second group frame 11 come into firm contact with the cam groove 5a of the cam frame 5, the contact force being transmitted to the cam frame 5, and the cam followers 31 come into contact with the cam groove 4c of the moving frame 4 in the optical axis O direction.

The contact forces are once received by the protruding portion 3e of the rotating frame 3, which is fitted in the circumferential groove 4e of the moving frame 4. Since the cam followers 34 and 33 and the cam followers 31 each have a taper shape, the cam frame 5 or the moving frame 4 is pressed in the outside diameter direction via the cam grooves 5b and 5a or the cam groove 4c by the contact force, and expands in the outside diameter direction due to elastic deformation. The deformation of the cam frame 5 is transmitted to the moving frame 4 side to similarly expand the moving frame 4 in the outside diameter direction.

In the case where the moving frame 4 expands as described above, a part of the first groove group 4f provided at the outer periphery thereof meshes with the second groove group 3f provided at the inner periphery of the rotating frame 3, or comes into firm contact therewith. That is to say, a part of the first groove group 4f interferes with the second groove group 3f. By the above-mentioned meshing or contacting, the further shift in the optical axis O direction of the moving frame 4 with respect to the rotating frame 3 is inhibited. In the case where the shift in the optical axis O direction of the moving frame 4 is inhibited in this manner, the above-mentioned contact force received by the protruding portion 3e does not increase further. Therefore, the coming-off of the protruding portion 3e of the rotating frame 3, which is fitted in the circumferential groove 4e of the moving frame 4, is prevented, and further the damage to the protruding portion 3e is also prevented.

As described above, according to the lens barrel 1 of the present embodiment, in the case where a large external force such as an impact force is applied to the first group frame 12 or the cam frame 5, or in the case where an impact force is applied to the second group frame 11 by dropping etc., the first groove group 4f provided on the moving frame 4 and the second groove group 3f provided on the rotating frame 3 mesh with each other or come into firm contact with each other, so that the shift in the optical axis O direction of the moving frame 4 with respect to the rotating frame 3 is inhibited. Thereby, the increase in contact force (shearing force) in the optical axis O direction that acts on the protruding portion 3e of the rotating frame 3 bayonet-connected to the moving frame 4 is restrained. Therefore, a trouble such that the protruding portion 3e comes off the groove portion 4e of the moving frame 4 or that the protruding portion 3e is damaged can be prevented. In other words, the engagement amount of the protruding portion 3e can be decreased, or the cross-sectional area along the optical axis O direction of the moving frame 4 can be decreased. Resultantly, the length in the optical axis O direction and the outside diameter dimension of the rotating frame 3 and the moving frame 4 can be decreased, so that the lens barrel 1 can be thinned.

In the above-described embodiment, the first groove group 4f provided on the moving frame 4 and the second groove group 3f provided on the rotating frame 3 are groove groups that are provided along the circumferential direction around the optical axis O and have an equal or different pitch in the optical axis O direction. However, the configuration is not limited to this one. The first groove group 4f and the second groove group 3f may be groove groups each having a predetermined lead angle with respect to the optical axis O. For example, like a threaded groove, a single spiral groove may be formed in the peripheral surface around the optical axis O. Also, a plurality of grooves, not a single groove, may be formed like a two-thread groove or a three-thread groove. Further, a groove group having a rhombic-lattice pattern can also achieve the same effect.

Also, in the above-described embodiment, the above-mentioned grooves are divided into sections by the cam grooves and the straight grooves provided in the frame member. However, this configuration has no problem in terms of function.

Also, in the above-described embodiment, the moving frame 4 and the rotating frame 3 are paired bayonet-connected frame members. However, the configuration is not limited to this one. Even if the paired frame members are connected by cam followers and a cam groove, by arranging groove groups that are the same as the first groove group 4f and the second groove group 3f on each of the paired frame members, the coming-off of the connecting portion between the cam followers and the cam groove or the damage thereto can be prevented.

Further, in the above-described embodiment, the construction is such that when the lens barrel 1 is subjected to an external force, the moving frame 4 side, which is the first frame member, deforms so as to expand. However, even in a lens barrel having a construction such that when an external force is applied, inversely, the second frame member side warps to the inside, by providing the first groove group and the second groove group in the first frame member and the second frame member, respectively, the shifts in the optical axis O direction of the first frame member and the second frame member at the time when the external force is applied can be prevented.

Also, both of the paired frame members are ideally formed of a synthetic resin so as to be deformed elastically. However, either one of the paired frame members may be capable of being deformed elastically.

The lens barrel in accordance with the present invention can be used as a lens barrel having an improved impact resistance.

The present invention is not limited to the above-described embodiment and modifications. Besides, at the implementation stage, various modifications and changes can be made without departing from the spirit and scope of the invention. Further, the above-described embodiment embraces inventions at various stages, and various inventions can be extracted by an appropriate combination of a plurality of constituent features disclosed.

For example, even if some constituent features are deleted from all of the constituent features shown in the embodiment, in the case where the problems described in the section of Description of the Related Art can be solved, and the advantages described in the section of SUMMARY OF THE INVENTION can be realized, the configuration from which the constituent features are deleted can be extracted as the invention.

What is claimed is:

1. A lens barrel comprising:
   a first frame member which is an elastically deformable cylindrical frame member having a first groove group, in which a plurality of grooves formed in the circumferential direction are arranged in the optical axis direction, at the outer periphery thereof; and
   a second frame member which is an elastically deformable cylindrical frame member engaging with the outer periphery of the first frame member and having a second groove group, in which a plurality of grooves formed in the circumferential direction are arranged in the optical axis direction so as to face to the first groove group, at the outer periphery thereof, the second frame member being movable relative to the first frame member without interference of the second groove group with the first groove group during the ordinary operation, wherein
   at least either one or both of the first frame member and the second frame member is deformed by an external force applied to the lens barrel so that the first groove group and the second groove group interfere with each other, whereby the relative shift in the optical axis direction of the first frame member and the second frame member is prevented.

2. The lens barrel according to claim 1, wherein
   the first groove group and the second groove group are formed so as to have an equal pitch in the optical axis direction.

3. The lens barrel according to claim 1, wherein
   the first groove group and the second groove group are formed so as to have a different pitch in the optical axis direction.

4. The lens barrel according to claim 1, wherein
   the first groove group and the second groove group each includes a single continuous groove formed so as to have an equal pitch in the optical axis direction.

5. The lens barrel according to claim 1, wherein
   the first groove group and the second groove group each have a saw-toothed cross section including the optical axis.

6. The lens barrel according to claim 1, wherein
   at least one of the first groove group and the second groove group is elastically deformable.

7. The lens barrel according to claim 1, wherein
   the first groove group and the second groove group are relatively movable.

8. The lens barrel according to claim 1, wherein
   the first groove group and the second groove group each have a plurality of groove portions and a plurality of protruding portions arranged alternately in the optical axis direction.

9. The lens barrel according to claim 8, wherein
   the protruding portions each have a pointed tip end.

10. The lens barrel according to claim 8, wherein
    the first groove group and the second groove group are formed so as to have an equal pitch in the optical axis direction.

11. The lens barrel according to claim 8, wherein
    the first groove group and the second groove group are formed so as to have a different pitch in the optical axis direction.

* * * * *